July 26, 1966 H. C. GRANT, JR 3,262,354
SMOKE DETECTING APPARATUS
Filed Oct. 11, 1962 8 Sheets-Sheet 2

INVENTOR
HARRY C. GRANT, JR.
BY
Ernest A. Brown
ATTORNEY

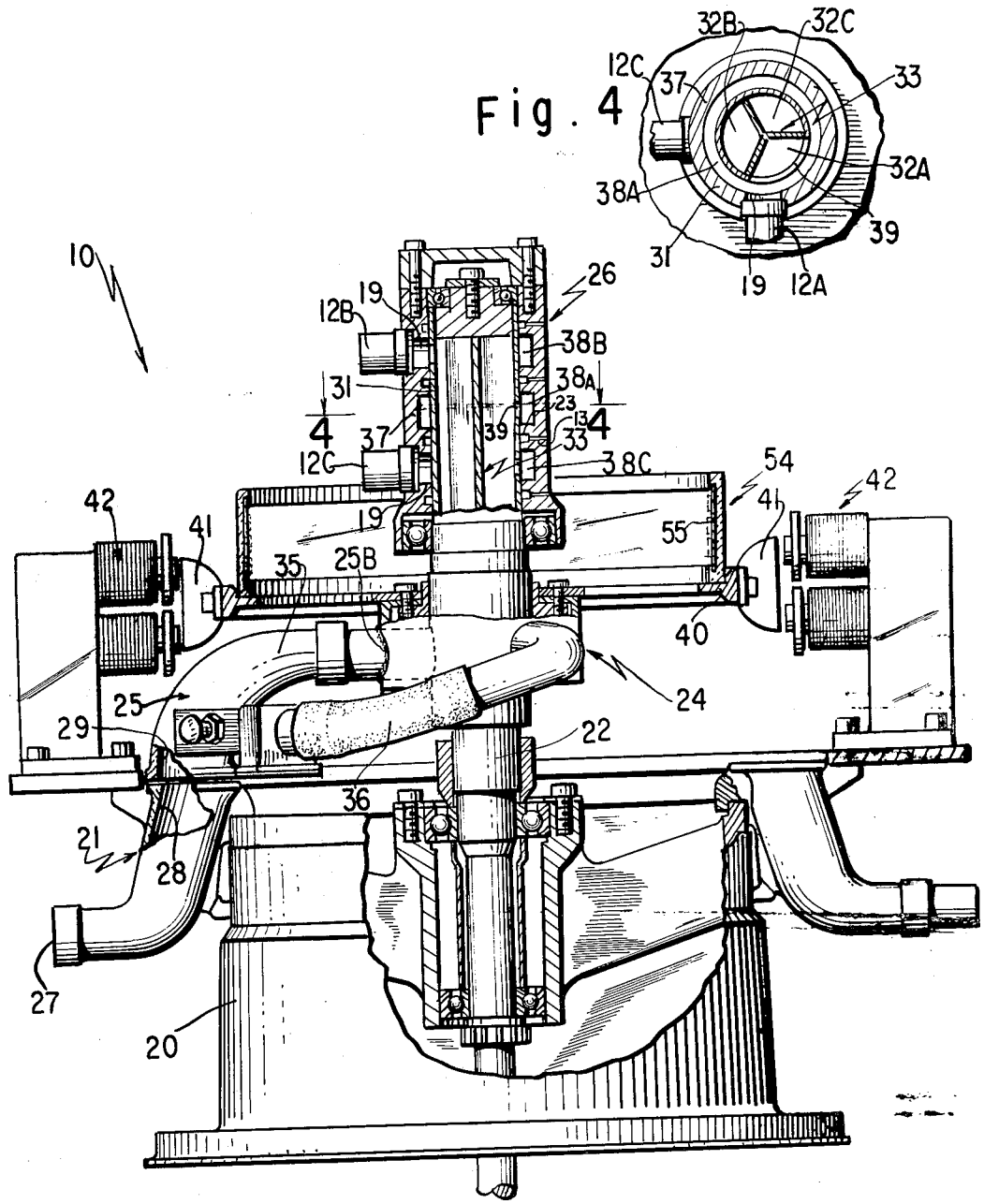

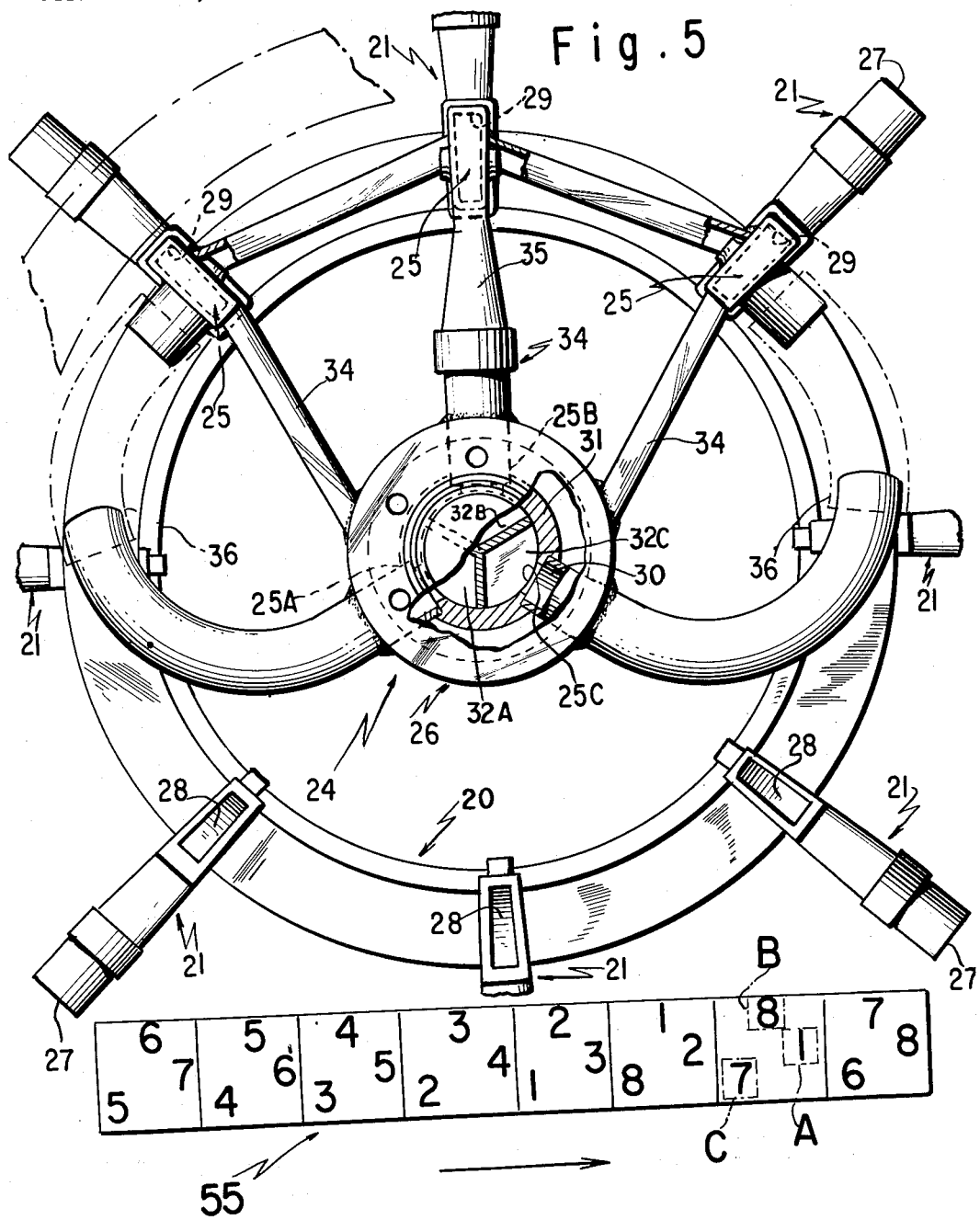

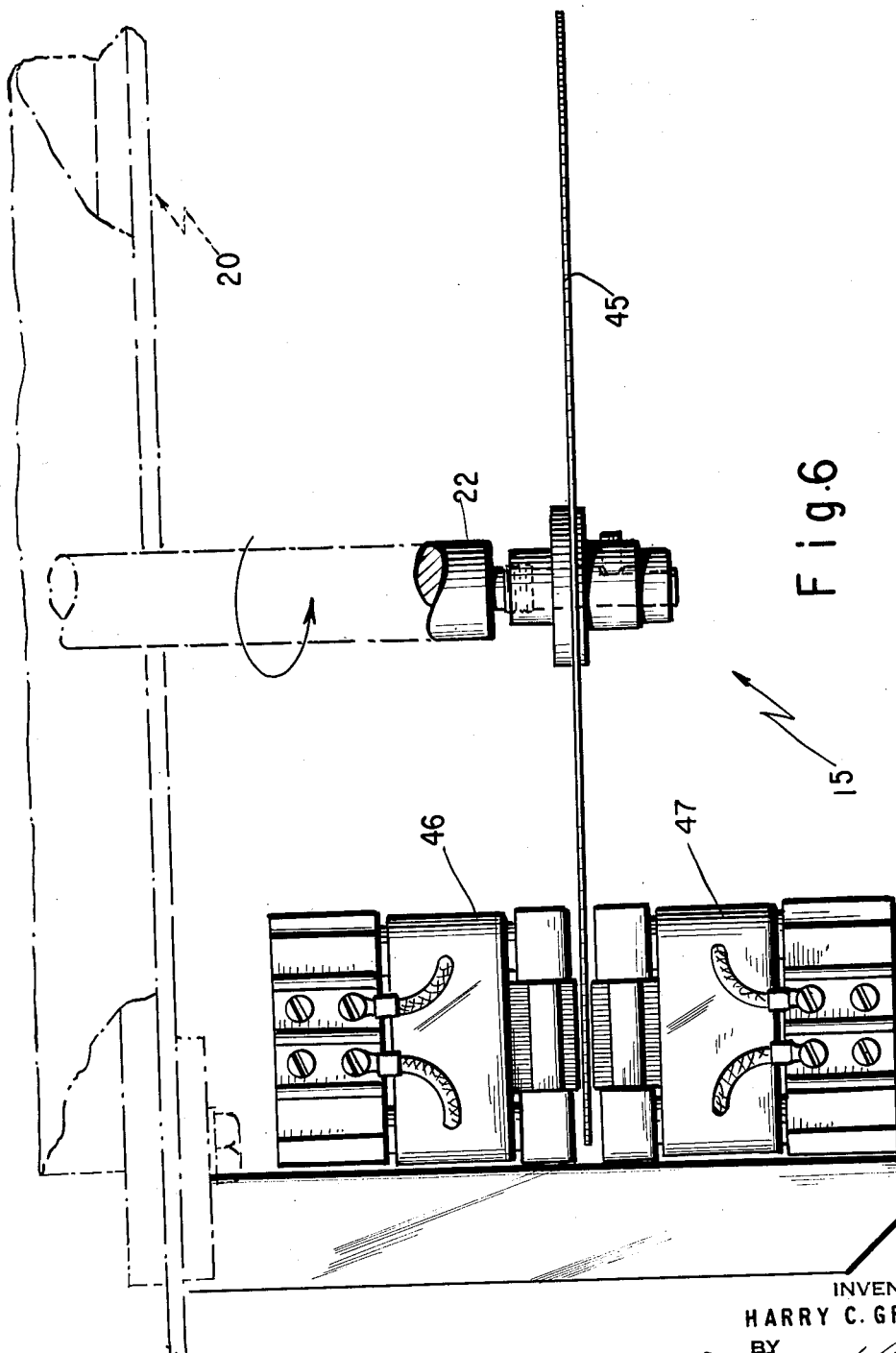

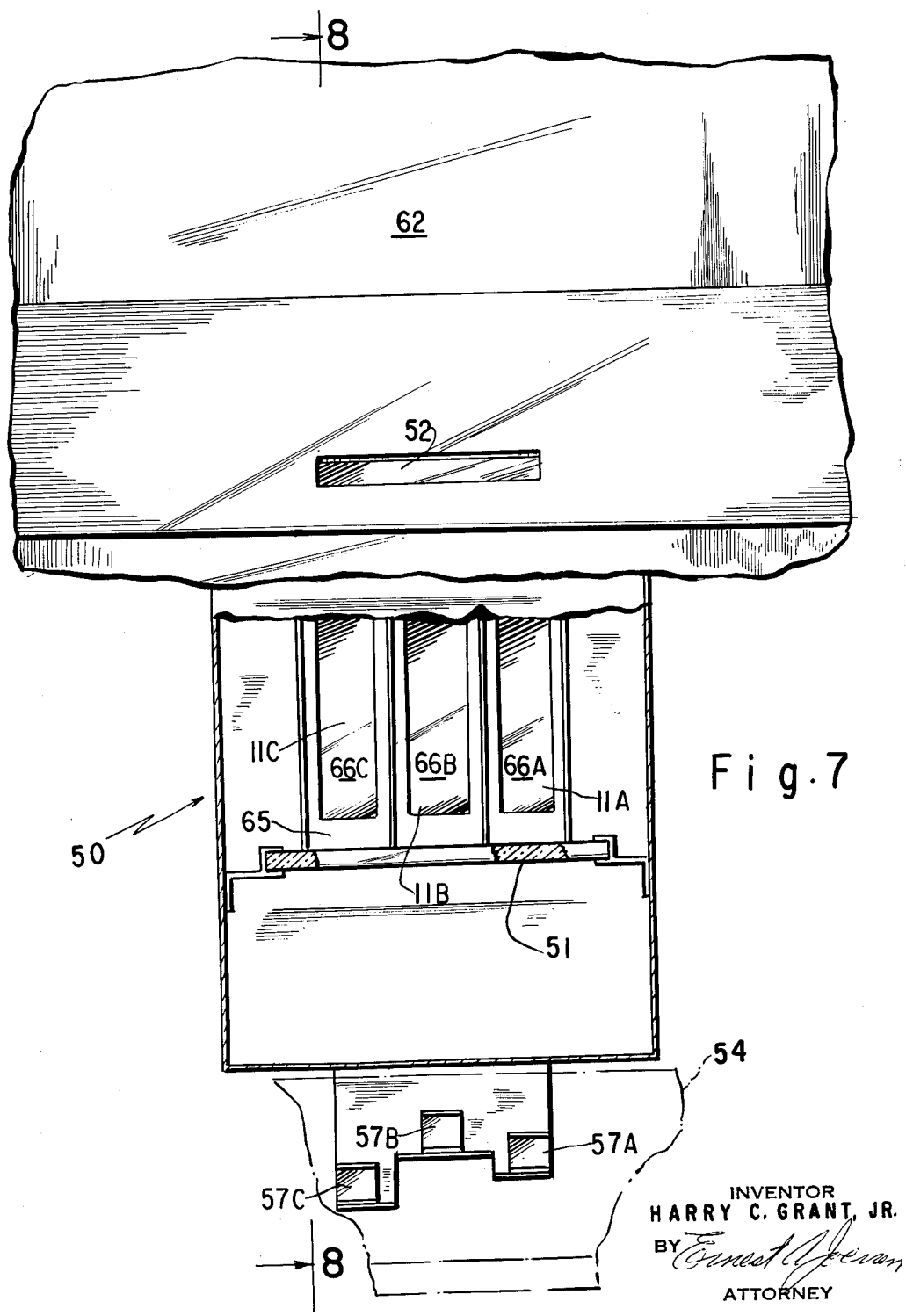

July 26, 1966  H. C. GRANT, JR  3,262,354
SMOKE DETECTING APPARATUS
Filed Oct. 11, 1962  8 Sheets-Sheet 7

INVENTOR
HARRY C GRANT, JR.
BY
ATTORNEY

United States Patent Office 3,262,354
Patented July 26, 1966

3,262,354
SMOKE DETECTING APPARATUS
Harry C. Grant, Jr., Ridgewood, N.J., assignor to Specialties Development Corporation, Belleville, N.J., a corporation of New Jersey
Filed Oct. 11, 1962, Ser. No. 229,807
8 Claims. (Cl. 88—14)

The present invention relates to smoke detecting apparatus, and more particularly to such apparatus for monitoring a plurality of spaces in which smoke is to be detected in an improved manner both visually and photoelectrically.

Heretofore, smoke detecting apparatus has been devised for monitoring a plurality of spaces visually and photoelectrically which required an observer to constantly watch a large number of tubes having air samples withdrawn from the spaces flowing therethrough. This was a difficult and tedious task and required considerable skill and experience on the part of the observer to identify the appearance of smoke in a particular tube.

Accordingly, an object of the present invention is to provide improved smoke detecting apparatus for visually monitoring a large number of spaces which requires an observer to watch only a few tubes at a time.

Another object is to provide such apparatus including an improved selector valve for successively supplying air samples to the tubes.

Another object is to provide such apparatus including an improved motor for driving the selector valve.

Another object is to provide such a selector valve which does not require seals or packings.

Another object is to provide such apparatus including an improved arrangement for visually referencing the spaces to the tubes.

Another object is to provide such apparatus including an arrangement for reviewing each air sample several times.

Another object is to provide such apparatus including a photoelectric smoke detecting device.

Another object is to provide such apparatus including an improved arrangement for inducing the flow of the air samples.

Another object is to provide such apparatus which is accurate and reliable and does not fatigue the observer.

A further object is to provide such apparatus which is relatively simple and economical in construction.

Other and further objects of the invention will be obvious upon understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

FIG. 3 is a sectional view taken substantially along the line 3—3 on FIG. 2.

FIG. 4 is a sectional view taken along the line 4—4 on FIG. 3 to illustrate details of a collector head.

FIG. 5 is a plan view of the pick-up head of the selector valve and the ports of the base of the selector valve with which the ports of the pick-up head are adapted to register, the central portion being broken to illustrate the connection of the pick-up head to the collector head.

FIG. 6 is a fragmentary side elevational view of a torque motor associated with the stepping brake and the selector valve shown in FIGS. 2 and 3.

FIG. 7 is a fragmentary front elevational view of a device for visually detecting smoke in air samples.

FIG. 9 is a fragmentary developed plan view of a strip for the ring having the numerals thereon.

GENERAL DESCRIPTION

Figure 1:
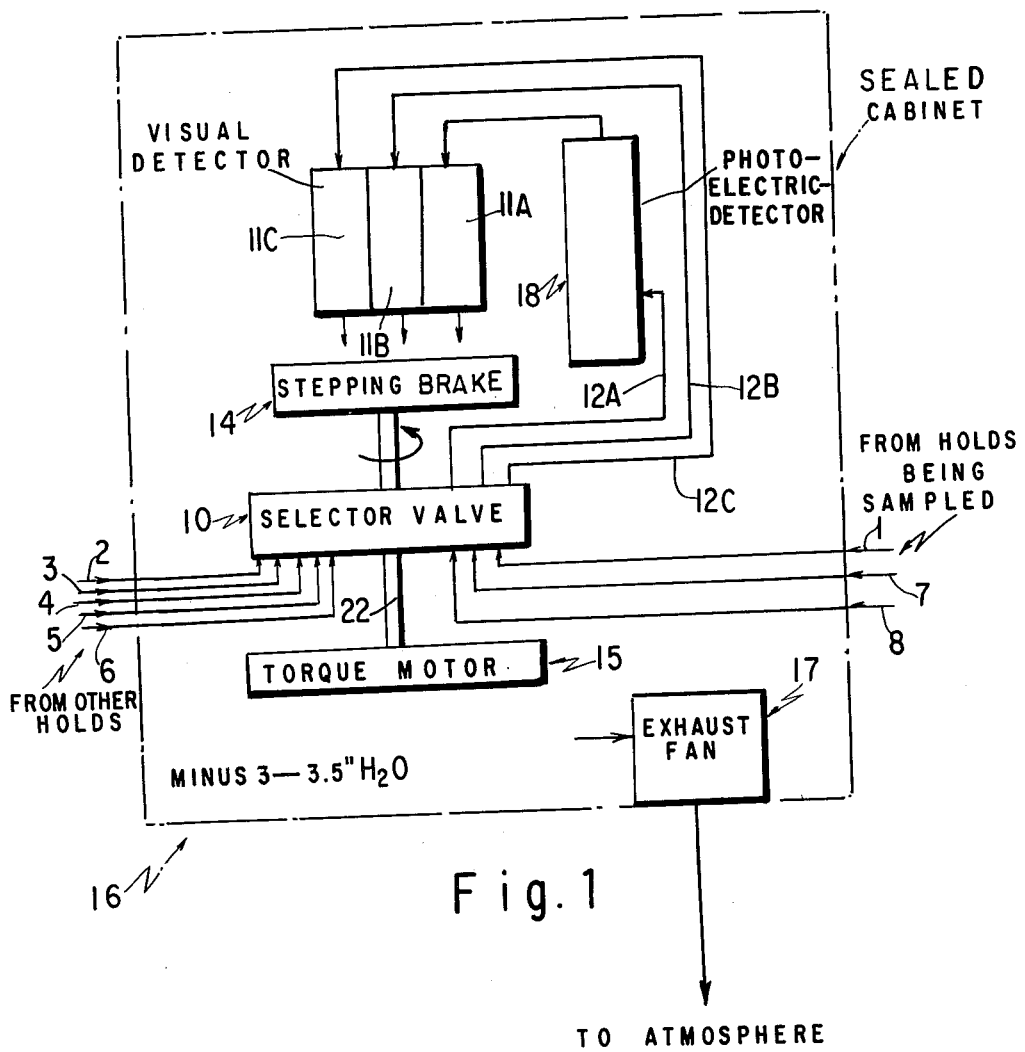
FIG. 1 is a diagrammatic view of the arrangement of the essential mechanisms of the apparatus and their fluid flow connections.

Referring now to FIG. 1 of the drawings in detail, smoke detecting apparatus is shown which comprises a selector valve 10 including a base having a number of circumferentially arranged ports, eight by way of example, each connected to a conduit of a group of conduits 1 to 8 for supplying air samples from a space in which smoke is to be detected, and a rotor mounted for rotation with respect to the base equipped with a pick-up head having a lesser number of ports than the base, three by way of example, adapted to register with the base ports; a number of tubes 11A, 11B and 11C for visually detecting smoke in the air samples; conduit means 12A, 12B and 12C for connecting the pick-up head ports with the tubes; a stepping brake 14 for effecting stepwise rotation of the selector valve rotor; a torque motor 15 for continually applying a force on the selector valve rotor to rotate the same; an enclosure 16 such as a sealed cabinet for the selector valves and the tubes; and means such as an exhaust fan 17 for creating a below atmospheric pressure in the enclosure to induce the flow of air from the spaces in which smoke is to be detected and to draw air samples through the tubes. One of the conduit means, for example, conduit means 12A, has connected therein a photoelectric smoke detecting device 18 such as disclosed in copending application Serial No. 212,097, filed July 24, 1962, now Patent No. 3,240,109, March 15, 1966.

THE EIGHT LINE SELECTOR VALVE

As shown in FIGS. 2, 3, 4, and 5, the selector valve 10 comprises a base 20 having eight passageways 21 therein spaced forty five degrees apart, a vertical shaft 22 journalled for rotation in the base and extending above and below the base, a pick-up head 24 mounted for rotation with the shaft 22 and having three pick-up tubes 25A, 25B and 25C thereon with adjacent tubes spaced forty five degrees apart, and a collector and distributor head 26 coupled to the upper end of the pick-up head 24 and having the conduit means 12A, 12B and 12C connected thereto. The base passageways 21 each have an inlet 27 to which one of the conduits 1 to 8 is connected and each have a normally open upwardly facing oblong outlet 28. The pick-up tubes 25 each have a downwardly facing oblong inlet 29 adapted to register with the outlets 28 of the base passageways (FIG. 3), and have an outlet 30 (FIG. 5) connected to the collector head 26 in the manner about to be described.

The head 26 includes a central tubular casing 31 connected to the upper end of the shaft 22 and subdivided into three equal sectors 32A, 32B and 32C by a partition member 33 (FIG. 4); three rigid arms 34 secured to the casing 31 and extending outwardly therefrom for supporting the pick-up head tubes 25, the middle arm being a pipe 35 connecting the outlet of the tube 25B to the sector 32B; and flexible conduits 36 for respectively connecting the outlets of the tubes 25A and 25C to the sectors 32A and 32C (FIG. 5).

The head 26 further includes a fixed tubular casing 37 surrounding the casing 31 and having three vertically spaced annular inwardly facing grooves 38A and 38C each provided with a radially extending opening 19 to which the conduit means 12A, 12B and 12C are connected (FIGS. 3 and 4). Fluid flow communication between the sectors 32A, 32B and 32C and the grooves 38A, 38B and 38C is respectively established by spaced elongate openings 39 in the casing 31 (FIGS. 3 and 4), whereby the pick-up head tubes 25A, 25B and 25C are always in fluid flow communication with the conduit means 12A, 12B and 12C respectively.

While the pick-up head 24 is illustrated herein as having three tubes, it will be understood that the pick-up head could have two, four or more tubes if desired.

Air samples are continuously drawn by negative pressure in the cabinet 16 through all the passageways starting at the inlets 29 of the pick-up head 25 and ending at the outlets 61 (FIG. 8) of the visual detecting tubes. Maximum negative pressure is applied to the outlets of the visual detecting tubes and decreases slightly in the direction towards the inlets 29. Negative pressure is also continuously applied to all of the selector valve outlets 28 connected to the air sample conduits 1 to 8 which are relatively long (about 75 to 900 feet) in comparison with the passageways from the inlets 29 to the outlets 61 of the visual detecting tubes. The conduits 1 to 8 commence within the spaces to be protected which are at atmospheric pressure. The pressure in the absolute sense therefore is highest at the spaces and is lowest at the outlets of visual detecting tubes; the absolute pressure at the outlets 28 and inlets 29 when in registry is much lower than at the spaces but is only slightly higher than at the outlets 61 of the visual detecting tubes; and the absolute pressure at the space between the casings 31 and 37 is very slightly greater than at the outlets 61 of the visual detecting tubes and is very slightly lower than at the pick-up head inlets 29, whereby air flow is in the direction from the higher to the lower pressure.

This enables seals or packings to be eliminated between relatively moving parts such as the ports of the selector valve base and the ports of the pick-up head and the rotating collector head casing 31 and the fixed casing 37, and enables such parts to be out of physical contact with a slight space therebetween whereby friction is eliminated.

Thus, any flow of air at the openings between the outlets 28 and inlets 29 and between the casing 31 and the casing 37 must be from higher to lower pressure and air flow would therefore be out of the air samples. While there is a loss of the air samples in quantity which has no significance, there is no dilution of the air samples which would be detrimental because the apparatus is arranged to detect smoke within a predetermined range of densities.

Due to the long length of the conduits 1 to 8 and the very short length of the passageways through the selector valve and the detector, the differences in pressure between the selector head inlets 29 and the visual detecting tube outlets and between these outlets and the collector head is minute. In addition, the clearance between the selector valve base outlets 28 and pick-up head inlets 29 is very small, which coupled with the very small pressure differentiations, makes the outward flow of air samples microscopic even though a considerable loss of air samples could be tolerated.

In order to prevent air samples in the collector head 26 leaking from one sector (32A, 32B or 32C) to another or from one collector groove (38A, 38B or 38C) to another, which may occur when there is a slight difference in pressure between adjacent sectors or grooves due to the fact that one sector and its groove are connected to a short air sample conduit and an adjacent sector and its groove are connected to a much longer air sample conduit, the adjacent sectors and grooves are isolated from each other by subjecting the leakage points to the negative pressure in the cabinet 16.

As shown in FIG. 3, this may be accomplished by providing in the casing 37 an annular groove 23 between the grooves 38A and 38B, providing a similar groove between the grooves 38A and 38C, and providing such a groove above the groove 38B and below the groove 38C with the grooves 23 being placed in communication with the interior of the cabinet 16 by a plurality of apertures 13.

Here again any leakage would be outwardly of the air samples with insignificant quantitative loss of air samples but without dilution or unwanted contamination of air samples.

THE BRAKE AND MOTOR

Figure 2:
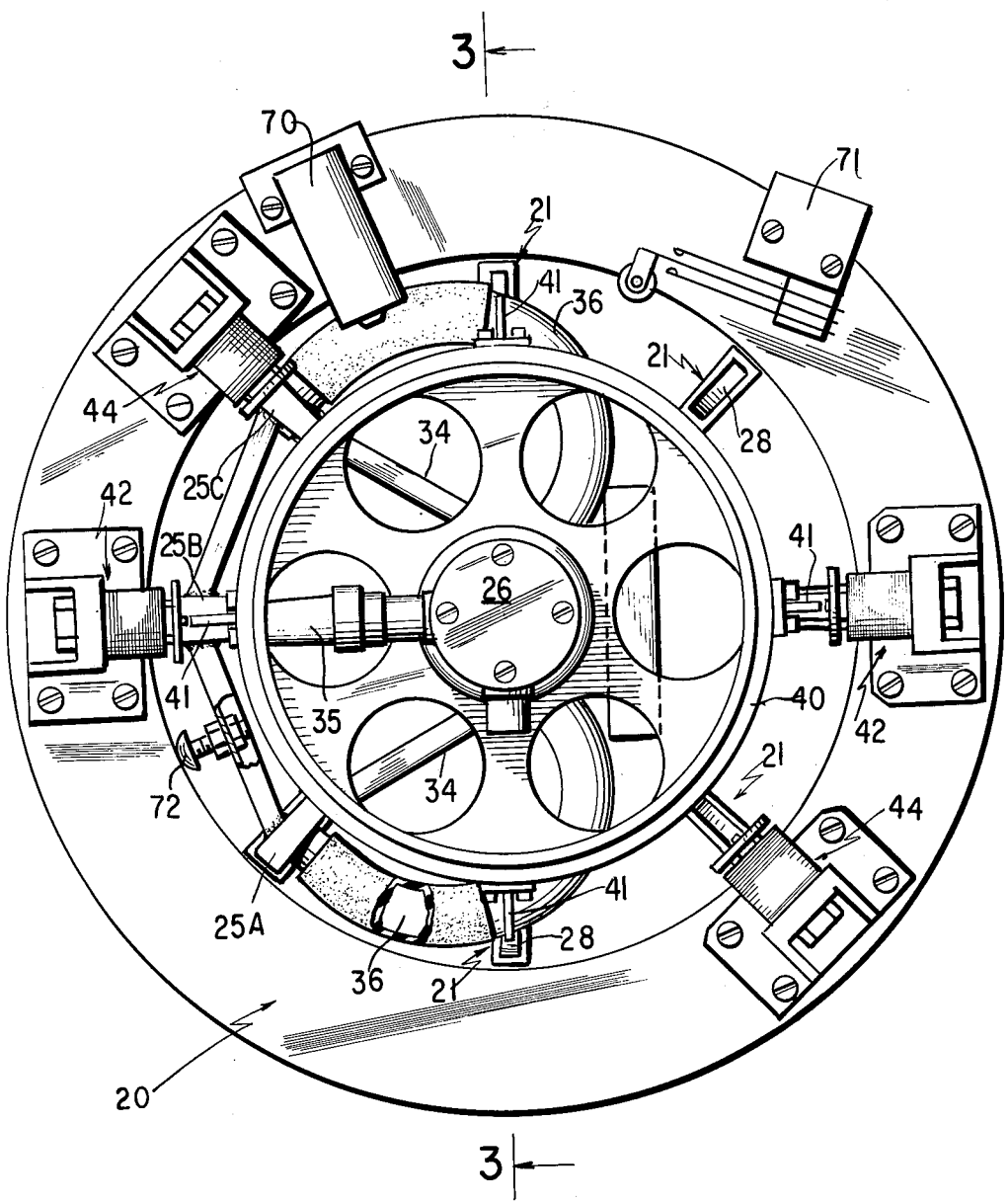
FIG. 2 is a top plan view of the stepping brake and the selector valve shown in FIG. 1.

The stepping brake 14, as shown in FIGS. 2 and 3, comprises a horizontal disc 40 connected to the upper end of the shaft 22 for rotation therewith, four radially extending armatures 41 on the disc 40 spaced circumferentially ninety degrees apart, and two pairs of electromagnets 42 and 44 on the base 20 for attracting the armatures 41 with the electromagnets indicated by like reference numerals being diametrically opposite each other and the electromagnets 42 being forty-five degrees in advance of the electromagnet 44. This arrangement provides for stepping the pick-up head 24 eight times to complete one revolution.

The torque motor 15, as shown in FIG. 6, comprises a horizontal flat metallic disc 45 secured to the lower end of the shaft 22 for rotation therewith, and induction coils 46 and 47 at opposite sides of the disc 45 adjacent the periphery thereof.

In the eight line arrangement just described the torque motor 15 serves to move the head 24 from one position to another (about 45°) when the electromagnets 42 and 44 are de-energized, and the electromagnets when energized serve to properly position the head 24 and hold the same in position by acting on the armature 41. The brake 14 and the motor 15 preferably operate so that the observer has at least a four second interval in which to observe each group of samples.

The brake 14 and the motor 15 include improvements which are the subject matter of co-pending application Serial No. 277,527, filed May 2, 1963, now Patent No. 3,240,964, March 15, 1966.

THE VISUAL DETECTOR

Figure 8:
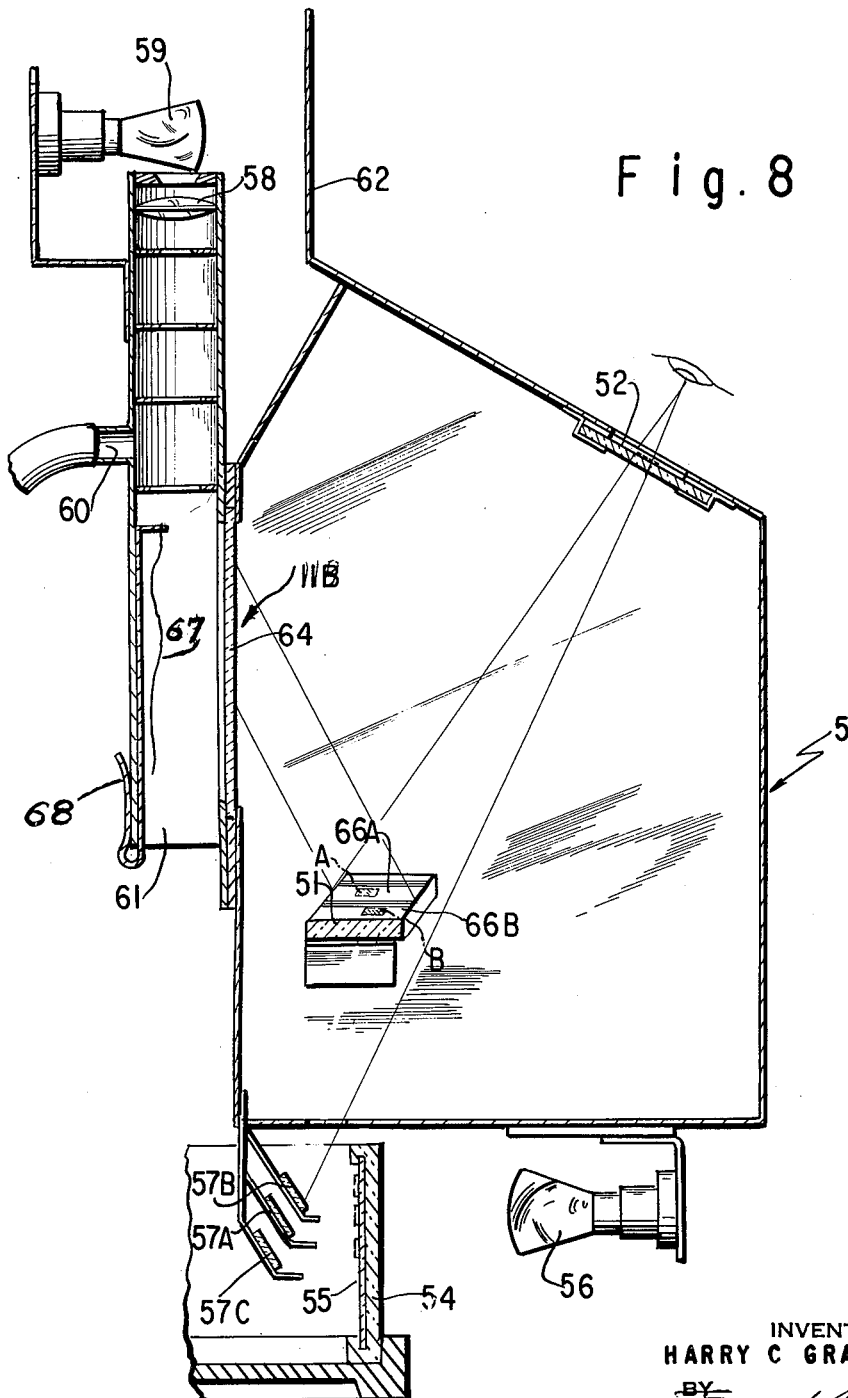
FIG. 8 is a sectional view taken along the line 8—8 on FIG. 7 with a mirror of the device shown in perspective and illustrating a portion of a ring having numerals thereon corresponding to the selector valve ports in communication with the visual detecting device.

As shown in FIGS. 7, 8, and 9, the visual detector generally comprises the sight tubes 11A, 11B and 11C, a light shielding or dark box 50 in front of the tubes, a mirror 51 in the box for simultaneously observing the three tubes through narrow horizontal window 52 in the box which defines the line of sight of the observer, a transparent ring 54 mounted for rotation on the stepping motor disc 40 (FIG. 3) and having a transparent numeral strip 55 thereon referenced to the eight lines connected to the selector valve ports 21, and a projector system including a light source 56 and mirrors 57A, 57B and 57C by which numerals from the strip 55 are projected and viewed through window 52 to reference the lines connected to the tubes 11A, 11B and 11C.

The sight tubes 11A, 11B and 11C are vertically arranged side-by-side (FIG. 7) and as shown in FIG. 8 include a focussing lens 58 which also closes the upper end of the tubes, a light source 59 above the lens for illuminating the space within the tubes, an opening 60 below the lens for connecting the conduit means 12A, 12B and 12C to the tubes 11A, 11B and 11C respectively, and an opening 61 at the lower end communicating with the enclosure defined by the cabinet 16 and evacuated by the exhaust fan 17, whereby air samples are drawn through the selector valve and the sight tubes.

The box 50 has a shield 62 on the top thereof which is positioned in front of the light source 59 to conceal the same from the view of the observer, and has a window 64 in the back wall which is positioned across the sight tubes and is provided with three frames 65 for dividing the portions of the sight tubes under observation into three distinct rectangular areas 66A, 66B and 66C.

The windows 52 and 64 and the mirror 51 are arranged so that the observer, when looking through the window 52, sees the reflection of the areas 66A, 66B and 66C on the mirror 51.

Preferably, an air flow indicator such as a flexible thread 67 is suspended by a clip 68 in the tube 11C and this thread by being reflected in the mirror 51 is seen in inverted position.

As shown in FIGS. 8 and 9, the numeral strip 55 is mounted on the periphery of the ring 54, and the mirrors 57A, 57B and 57C are placed within the ring 54 so that the light source 56 projects numerals from the strip onto these mirrors. The mirrors 57A, 57B and 57C are arranged side-by-side and are inclined and referenced with the areas 66A, 66B and 66C respectively so that it appears to the observer that numerals seen on the three mirrors are each on one of the areas, whereby the lines under observation are readily associated with the sight tubes.

In order to enable three numerals to be viewed at one time and be repeated twice so that the air samples of the lines under observation can be inspected in three different sight tubes, numerals 1 to 8 are arranged in three vertically spaced horizontal rows (FIG. 9), and the mirrors 57A, 57B and 57C are spaced vertically (FIGS. 7 and 8) to respectively have projected thereon numerals from the middle, top and bottom rows. As shown in FIG. 9, the numerals are circumferentially spaced on the strip and arranged in eight groups approximately forty-five degrees apart so that the groups shown are consecutively viewed from right to left as the numeral strip is moved by the motor 15 from left to right. It will be noted that the blank spaces between the groups of numerals have broken away to shorten the numeral strip lengthwise and enable it to be shown on an enlarged scale.

OPERATION

In operation, the light sources 56 and 59 are illuminated; the photoelectric detector 18 is energized; the stepping brake 14 and the torque motor 15 are started to position the selector valve pick-up head 24 and the numeral ring 55 to thereby index the pick-up head tubes 25A, 25B and 25C with three of the base passages 21 connected to the lines 1 to 8 and to correspondingly index three of the numerals with the mirrors 57A, 57B and 57C, on the areas 66A, 66B and 66C to indicate the lines being supervised; and the exhaust fan 17 is started to reduce the pressure within the cabinet to between about minus three and about minus three and one half inches of water whereby air samples are induced to flow through the lines 1 to 8 to the outlets of the passageways 21 and through the visual tubes 11A, 11B and 11C which are connected to the base passageways over which the pick-up tube inlets are positioned. In this manner, there is a constant flow of air samples in all of the lines which samples can be tested and observed almost instantly when picked up by the selector valve tubes 25A, 25B and 25C.

For example, as shown in FIG. 9, the selector valve 10 may start with the numerals 1, 8 and 7 respectively referenced to elements 11, 12, 25, 32, 38, 57 and 66 which are suffixed A, B and C to indicate that air samples from lines 1, 8 and 7 are being observed. Should smoke be present in line 1 sample it will pass through the photoelectric detector 18 to actuate the same before being observed in the tube 11A. After the selector valve 10 and the numeral strip 55 are stepped, the numerals 2, 1 and 8 are referenced to the A, B and C elements, so that the air samples from lines 1 and 8 may be observed a second time and to verify the presence of smoke in the line 1 sample. After the selector valve and the numeral strip are stepped again, the numerals 3, 2 and 1 are referenced to the A, B and C elements, so that the air samples from line 2 may be observed a second time and the air sample from line 1 may be observed a third time to again verify the presence of smoke in the line 1 sample. In this manner the observer has three opportunities to see smoke in the sample from each line. Furthermore, when smoke appears in the air sample passing through the middle tube 11B, there is a vivid contrast between the brightened middle area 66B and the dark areas 66A and 66C at the sides thereof.

While not shown herein, an air sample line may be omitted at one of the base passageways so that there is at least one selector valve position during which the integrity of the apparatus can be tested, for example, by operating switches 70 and 71 (FIG. 2) with a button 72 on the selector valve rotor.

THE FORTY-EIGHT LINE SELECTOR VALVE

The eight line selector valve just described is adapted to be modified by way of example to provide passageways 21 therein for accommodating twelve, sixteen, twenty, twenty-four, twenty-eight, thirty-two, thirty-six, forty, forty-four or forty-eight lines. The stepping brake electromagnets 42 and 44 are adapted to be placed closer to each other to provide shorter steps and a greater number of steps equal to the number of lines to complete one revolution of the pick-up head; the pick-up head tubes 25A, 25B and 25C are placed closer together; and an appropriate numeral strip 55 is placed on the ring 54, as about to be described.

Figure 10:
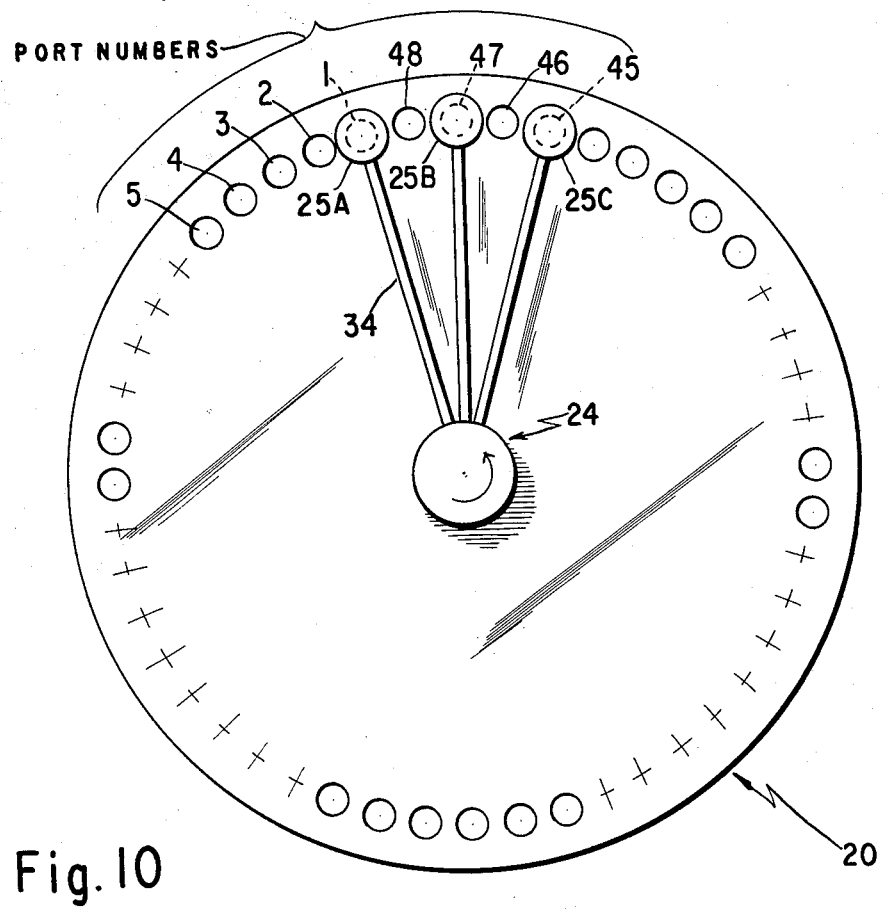
FIG. 10 is a schematic plan view of a selector valve base having ports for forty-eight lines and a pick-up head arranged to cooperate with this base.

For example, a forty-eight line selector valve is shown schematically in FIG. 10 wherein the passageways 21 in the base 20 are spaced circumferentially seven and one half degrees apart and the pick-up head tubes 25A, 25B and 25C are spaced fifteen degrees apart so that the tube inlets are in registry with alternate base passageway outlets and an open base passageway is provided between adjacent pick-up head tubes.

Figure 11:
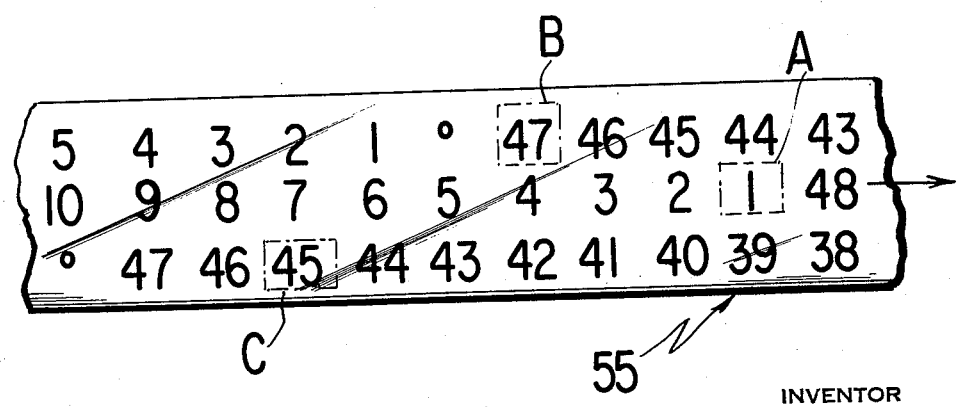
FIG. 11 is a fragmentary developed plan view of a numeral ring for use with the selector valve shown in FIG. 10.

The numeral strip is thus arranged to skip the intermediate open passageways 21 and to reference the alternate passageways in registry with the pick-up head tubes so that the numerals are referenced to the smoke tube window areas 66A, 66B and 66C in alternate odd and even groups as shown in FIG. 11 instead of in groups as shown in FIG. 9.

For example, in a selector valve stepped forty-eight times to complete one revolution, the numerals appear in groups as follows:

| Step | Area 66A | Area 66B | Area 66C |
|---|---|---|---|
| 1 | 1 | 47 | 45 |
| 2 | 2 | 48 | 46 |
| 3 | 3 | 1 | 47 |
| 4 | 4 | 2 | 48 |
| 5 | 5 | 3 | 1 |
| 6 | 6 | 4 | 2 |
| . | . | . | . |
| . | . | . | . |
| 47 | 47 | 45 | 43 |
| 48 | 48 | 46 | 44 |
| 1 | 1 | 47 | 45 |

It will be noted that the collector head 26 (FIGS. 3 and 5) does not require any changes to accommodate a different number of selector valve passageways 21 because the middle arm 34 is fixed and the outer arms 34 with the flexible conduits 35 and 36 of the pick-up head can be adjusted to provide the proper spacing of the inlets of the tubes 25A, 25B and 25C without disturbing the connections to the collector casing 37.

In such an arrangement, the pairs of electromagnets 42 and 44 are spaced circumferentially thirty-seven and one half degrees apart with the two like electromagnets of each pair opposite each other, and twenty-four armatures are provided which are spaced circumferentially apart fifteen degrees.

The operation of the forty-eight line selector valve is similar to that of the eight line selector valve except for the stepping of the selector head and the numeral strip arrangement.

CONCLUSION

The electrical wiring for automatic operation and periodic testing of the apparatus shown and described herein is the subject matter of co-pending application Serial No. 260,007, filed February 20, 1963, now Patent No. 3,234,536, February 8, 1966.

From the foregoing description, it will be seen that the present invention provides improved apparatus for detecting smoke.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In smoke detecting apparatus, the combination of a base having at least eight equidistantly circumferentially spaced apart ports therein each provided with an inlet and with an outlet for connection to a conduit for supplying air samples from a space in which smoke is to be detected, a rotor mounted for rotation with respect to said base including a head having a group of three ports each provided with an outlet and with an inlet arranged so that three head port inlets simultaneously register with three base port outlets respectively, three tubes arranged side-by-side for visually detecting smoke in the air samples and each provided with an inlet and an outlet, conduit means connecting each of said head port outlets with one of said tube inlets, and motor means for effecting stepwise rotation of said rotor to successively place three said head port inlets in registry with three said base port outlets, said conduit means being connected to cause an air sample from the same space to flow through each of said tubes at a different time so that a group of air samples is viewed with each sample of the group being viewed three times but in a different one of said tubes in a given sequence.

2. In smoke detecting apparatus, the combination of three tubes arranged side-by-side having a window for visually detecting smoke in air samples from a greater number of spaces than there are tubes, valved conduit means for directing the air samples from the spaces through said tubes, indexing means for controlling said valved conduit means, indicia means driven by said indexing means having indicia arranged in groups thereon for indicating the spaces from which the air samples have been withdrawn while such air samples are passing through said tubes, light shielding means positioned in front of said tubes having an opening for defining the line of sight towards said windows, and means for placing said windows and certain of said indicia in the line of sight with the indicia referenced to the windows and including a mirror for reflecting said windows into the line of sight and mirror means for each of said tubes for reflecting the indicia referenced to said windows into the line of sight, said indicia means having three rows of indicia thereon and said mirror means being arranged to each reflect indicia of one of said rows.

3. In apparatus according to claim 2, wherein said mirror means are horizontally spaced apart and aligned with said windows and are vertically spaced with respect to each other to thereby reflect only one row of indicia.

4. In apparatus according to claim 2, wherein said indicia means includes a translucent member having opaque indicia thereon, and a light source is positioned to project said indicia onto said mirror means.

5. In apparatus according to claim 4, wherein said member is a ring mounted for rotation and positioned to pass between said light source and said mirror means.

6. In apparatus according to claim 1, including an electric smoke detector connected in one of said conduit means.

7. In apparatus according to claim 6, wherein said electric smoke detector is connected in said conduit means to which a given said line is first connected, whereby upon operation of said detector an observer can again view the air sample which caused operation of said detector.

8. In apparatus according to claim 2, wherein said conduit means have leakage points which enable an air sample of one conduit means to flow into another conduit means, and said leakage points are in fluid flow communication with said enclosure and are subjected to the below atmospheric pressure within said enclosure, whereby leakage will be drawn into said enclosure.

References Cited by the Examiner

UNITED STATES PATENTS

| | | | |
|---|---|---|---|
| 1,422,178 | 7/1922 | Cooley | 137—625.23 |
| 1,755,834 | 4/1930 | Marr et al. | |
| 1,801,717 | 4/1931 | Brooks | 137—625.23 |
| 2,033,466 | 3/1936 | Grant | 340—213 |
| 2,034,281 | 3/1936 | Buchholz | 340—213 |
| 2,118,836 | 5/1938 | Carter. | |
| 2,118,837 | 5/1938 | Felton | 340—213 |
| 2,306,588 | 12/1942 | Cahusac et al. | 88—14 |
| 2,991,804 | 7/1961 | Merkle | 137—625.23 |

JEWELL H. PEDERSEN, *Primary Examiner.*

W. L. SIKES, *Assistant Examiner.*